US012655820B2

(12) United States Patent
Biegert et al.

(10) Patent No.: US 12,655,820 B2
(45) Date of Patent: Jun. 16, 2026

(54) FUEL INJECTOR NOZZLE AND FABRICATION METHOD FOR THE SAME

(71) Applicant: Cummins Inc., Columbus, IN (US)

(72) Inventors: Scott M. Biegert, Columbus, IN (US); Brian J. Wright, Indianapolis, IN (US); Darin Bartholomew, Columbus, IN (US)

(73) Assignee: Cummins Scania HPCR System, LLC, Columbus, IN (US)

(*) Notice: Subject to any disclaimer, the term of this patent is extended or adjusted under 35 U.S.C. 154(b) by 0 days.

(21) Appl. No.: 18/921,613

(22) Filed: Oct. 21, 2024

(65) Prior Publication Data

US 2025/0146462 A1 May 8, 2025

Related U.S. Application Data

(60) Provisional application No. 63/595,462, filed on Nov. 2, 2023.

(51) Int. Cl.

| | |
|---|---|
| ***F02B 5/00*** | (2006.01) |
| ***F02M 61/16*** | (2006.01) |
| ***F02M 61/18*** | (2006.01) |

(52) U.S. Cl.

CPC ...... *F02M 61/1806* (2013.01); *F02M 61/168* (2013.01); *F02M 2200/9038* (2013.01); *F02M 2200/9061* (2013.01)

(58) Field of Classification Search

CPC ................ F02M 61/18; F02M 61/166; F02M 2200/9038; F02M 2200/9046; F02M 2200/9061; C23C 8/26

USPC ........................................................ 123/305

See application file for complete search history.

(56) References Cited

U.S. PATENT DOCUMENTS

| | | | | |
|---|---|---|---|---|
| 3,773,265 | A | 11/1973 | Kent | |
| 5,351,398 | A | 10/1994 | Haxell | |
| 5,765,755 | A | 6/1998 | Peters et al. | |
| 6,168,095 | B1 * | 1/2001 | Seitter .................. | F02M 61/166 239/DIG. 19 |
| 6,679,953 | B1 | 1/2004 | Barnhart et al. | |
| 10,125,734 | B2 | 11/2018 | Paulus et al. | |
| 11,371,132 | B2 | 6/2022 | Umehara et al. | |
| 2004/0040630 | A1 | 3/2004 | Eiraku et al. | |
| 2005/0067512 | A1 | 3/2005 | Shimizu et al. | |
| 2010/0025500 | A1 | 2/2010 | Pollard et al. | |
| 2014/0175193 | A1 | 6/2014 | Moore | |
| 2014/0203109 | A1 | 7/2014 | Geisser | |

(Continued)

FOREIGN PATENT DOCUMENTS

| | | | |
|---|---|---|---|
| DE | 10256590 | A1 | 6/2004 |
| GB | 2545195 | A | 6/2017 |

(Continued)

*Primary Examiner* — Hung Q Nguyen
*Assistant Examiner* — James J Kim
(74) *Attorney, Agent, or Firm* — Taft, Stettinius & Hollister LLP

(57) ABSTRACT

A fuel injector and a nozzle for a fuel injector is provided. The nozzle is fabricated from a hardened nozzle body blank. The hardened nozzle body blank is machined to leave a hard wear resistant layer on the exterior surface of nozzle body blank. The nozzle includes at least one spray hole that is formed through the hard wear resistant layer on the exterior surface of the nozzle body blank.

20 Claims, 3 Drawing Sheets

(56) References Cited

U.S. PATENT DOCUMENTS

| | | | | |
|---|---|---|---|---|
| 2015/0083829 | A1* | 3/2015 | Werger | F02M 61/18 29/890.132 |
| 2015/0132539 | A1 | 5/2015 | Bailey et al. | |
| 2016/0221118 | A1 | 8/2016 | Yamashita et al. | |
| 2019/0285039 | A1* | 9/2019 | Saito | F02M 61/14 |
| 2022/0349370 | A1* | 11/2022 | Crow | C21D 1/25 |
| 2024/0133344 | A1 | 4/2024 | Prakash et al. | |
| 2024/0229753 | A9* | 7/2024 | Edwards | F02M 61/18 |

FOREIGN PATENT DOCUMENTS

| | | | |
|---|---|---|---|
| JP | 2013170475 | A | 9/2013 |
| JP | 2017528635 | A | 9/2017 |
| WO | 2019206895 | A1 | 10/2019 |
| WO | 2021154360 | A1 | 8/2021 |

* cited by examiner

FUEL INJECTOR NOZZLE AND FABRICATION METHOD FOR THE SAME

CROSS-REFERENCE TO RELATED APPLICATION

The present application claims the benefit of the filing date of, and priority to, U.S. Provisional App. Ser. No. 63/595,462 filed on Nov. 2, 2023, which is incorporated herein by reference.

FIELD OF THE DISCLOSURE

The present disclosure relates generally to a fuel injection system for an internal combustion engine and, more particularly, to fuel injector nozzles and fabrication methods for the same.

BACKGROUND

Some fuel injectors include one or more spray holes extending through the nozzle of the fuel injector. The spray holes are subject to high mechanical loads and stress during the fuel injection process. As a result, cavitation and erosion in the material along the spray hole can change the injection form and the amount of fuel that passes through the spray hole. Therefore, the fuel injector nozzles are replaced at appropriate intervals. While various attempts have been made at improving the durability of the nozzle spray holes, there remains a need for further improvements such as those disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific terminology will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY

The present disclosure includes a unique nozzle for a fuel injector and fuel injection system for an internal combustion engine. The nozzle includes at least one spray hole for spraying fuel from the fuel injector. The spray hole extends from an inner surface of the nozzle to an outlet at the outer, exterior surface of the nozzle. The exterior surface includes a hard wear resistant layer of material through which the at least one spray hole is formed that improves wear-resistance at the outlet of the at least one spray hole, improving fuel injector performance and longevity.

In an embodiment, nozzle for a fuel injector is provided. The nozzle includes an elongated body extending along a longitudinal axis from a first end of the elongated body to an opposite second end of the elongated body. The elongated body includes a longitudinally extending fuel passage extending from the first end of the elongated body to the second end of the elongated body. An exterior surface at the second end of the elongated body includes a hard wear resistant layer. At least one spray hole at the second end of the elongated body is formed through the hard wear resistant layer that is formed on the exterior surface of the elongated body. The at least one spray hole extends from the exterior surface to the interior surface.

A method for producing a fuel injector nozzle is disclosed. The method includes hardening a nozzle body blank to include a hardened core and a hardened case that is harder than the hardened core; machining the hardened case of the nozzle body blank to maintain a hard wear resistant layer on the exterior surface of the nozzle body blank; and forming at least one spray hole through the hard wear resistant layer on the exterior surface of the nozzle body blank.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DETAILED DESCRIPTION OF ILLUSTRATIVE EMBODIMENTS

Figure 1:
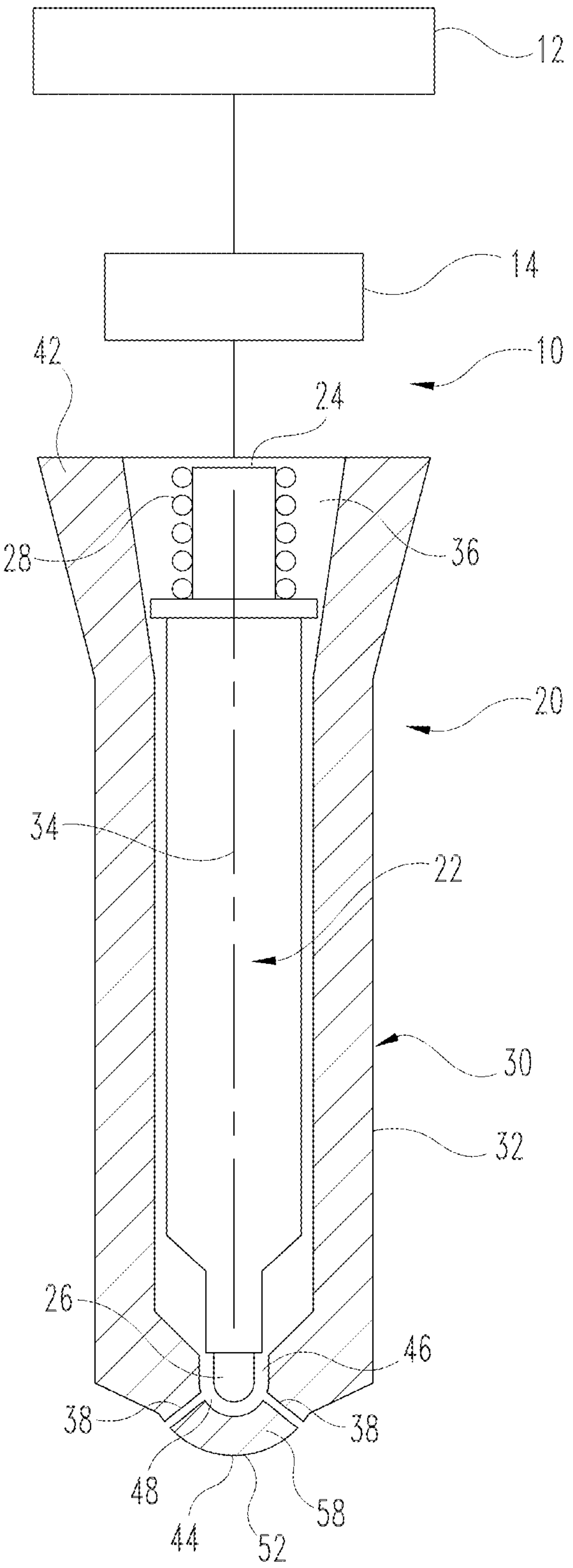
FIG. 1 is a schematic sectional view of a fuel injector according to an embodiment of the present disclosure.

With reference to FIGS. 1-4, there is illustrated a nozzle 30 for a fuel injector 20. The nozzle 20 includes an elongated body 32 extending along a longitudinal axis 34 from a first end 42 of the elongated body 32 to an opposite second end 44 of the elongated body 32. The elongated body 32 includes an inner surface 50 defining a longitudinally extending fuel passage 36 extending from the first end 42 of the elongated body 32 to the second end 44 of the elongated body 32. An exterior surface 52 at second end 44 of elongated body 32 includes a hard wear resistant layer 70. At least one spray hole 38 at the second end 44 of the elongated body 32 is formed through the hard wear resistant layer 70 that is formed on exterior surface 52 of elongated body 32, the at least one spray hole extending from the exterior surface to the interior surface.

Figure 5:
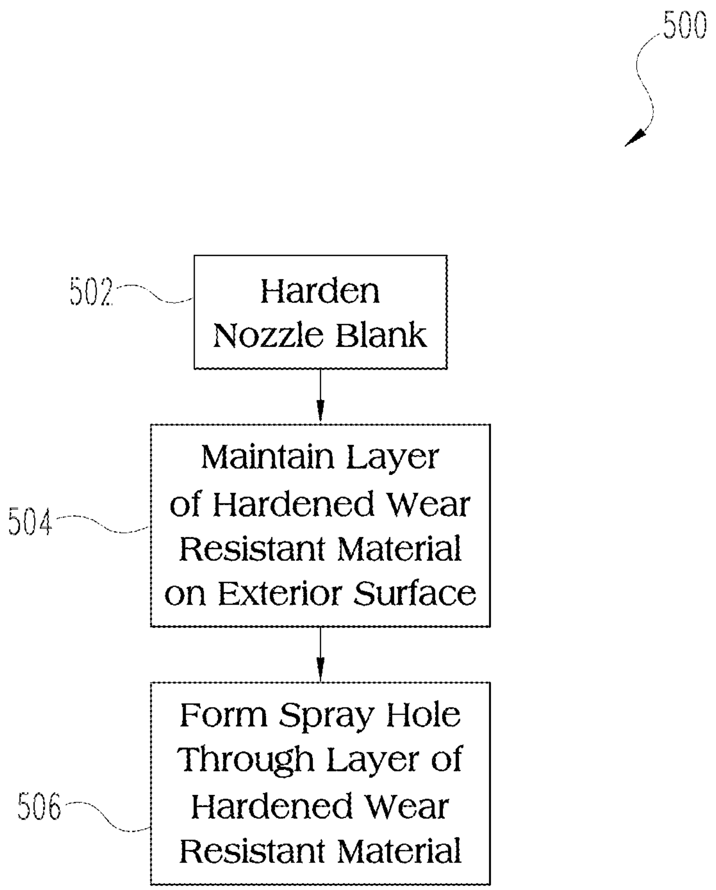
FIG. 5 is a flow diagram of a procedure for fabricating a nozzle for a fuel injector, according to an embodiment of the present disclosure.

With further reference to FIG. 5, a method 500 for producing a fuel injector nozzle 30 is disclosed. Method 500 includes an operation or step 502 to harden a nozzle body blank 32' to include a hardened core 74 and to harden the nozzle body blank 32' to include a hardened case that is harder than the hardened core 74; an operation or step 504 to machine the hardened case of the nozzle body blank 32' to maintain a hard wear resistant layer 70 on an exterior surface 52 of the nozzle body blank 32'; and an operation or step 506 to form at least one spray hole 38 through the hard wear resistant layer 70 on the exterior surface 52 of the nozzle body blank 32'.

Referring to FIG. 1, a fuel injector system 10 includes an accumulator 12 connected to a fuel injector 20 with connection components 14. Accumulator 12 may be, for example, part of a high pressure common rail fuel injector system. Connection components 14 may include, for example, valves, throttles, control chambers, tubing, and other components that may be typically provided to connect a fuel injector 20 to an accumulator 12.

Fuel injector 20 includes a nozzle 30 that houses a needle 22. Nozzle 30 includes an elongated body 32 that extends along a central longitudinal axis 34. Body 32 includes a fuel passage 36 that receives needle 22 therein. The needle 22 is elongated and extends between a proximal end 24 and a distal end 26 of needle 22. The needle 22 moves up and down longitudinally in the fuel passage 36 to selectively start and stop fuel injection from the fuel passage 36 through one or more spray holes 38 of nozzle 30.

Although only two spray holes 38 are shown, embodiments are contemplated with just one spray hole, or with three or more spray holes. In addition, the spray holes 38 may be arranged in any pattern on nozzle 30. In the illustrated embodiment, spray holes 38 are circular and include a uniform diameter from inlet to outlet. However, non-circular spray holes, and spray holes with non-uniform or varying dimensions along the axial length of the spray hole are also contemplated.

Nozzle 30 includes a proximally oriented first end 42 and an opposite distally oriented second end 44. Second end 44 includes a dome 58 with a convex exterior surface 52. Dome 58 extends around longitudinal axis 34, and spray holes 38 are formed through dome 58 from exterior surface 52 to inner surface 50.

Fuel passage 36 forms a sac 46 in a nozzle seat 48 located at second end 44 of body 32. The distal end 26 of the needle 22 is moved into and out of engagement with inner surface 50 at nozzle seat 48 to selectively close and open spray holes 38 for injection of fuel from sac 46.

For example, during a fuel injection event, a closing force is removed from needle 22 to allow needle 22 to be lifted off the inner surface 50 of nozzle seat 48 so that fuel is injected from sac 46 into an engine cylinder (not shown) through spray holes 38. A needle spring 28 surrounding a portion of the needle 22 may be provided in the fuel passage 36 to assist in controlling longitudinal movement of the needle 22.

Figure 2:
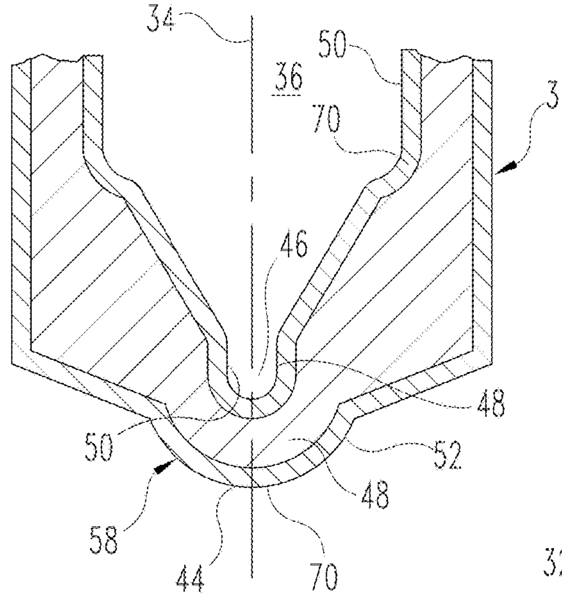
FIG. 2 is a schematic sectional view illustrating certain aspects of fabricating a nozzle for the fuel injector of FIG. 1, according to an embodiment of the present disclosure.

Further details of the nozzle 30, including dome 58 and spray holes 38, will now be discussed with reference to FIGS. 2-4, it being understood that such details may also apply to any other spray holes provided with nozzle 30. In FIG. 2, a nozzle body blank 32' is shown before forming spray holes 38. Nozzle body blank 32' is core hardened to a first hardness and then case hardened to a second hardness before forming spray holes 38. As a result, a hard wear resistant layer 70 is formed on exterior surface 52, including on dome 58 at distal end 44 of nozzle body blank 32'. In addition, a hard wear resistant layer 70 can be formed on inner surface 50.

In an embodiment, first hardness is 40-45 HRC (Rockwell hardness), and the second hardness is 60-65 HRC. Other embodiments contemplate other hardness values and/or measurements, so long as the hard wear resistant layer is harder than the core.

In an embodiment, the nozzle body blank 32' is dimensioned so that even after final machining of nozzle body blank 32', the hard wear resistant layer 70 remains on dome 58 and maintains a desired minimum thickness between inner surface 50 and exterior surface 52 at the locations in which spray holes 38 are to be formed. In an embodiment, the desired minimum thickness is at least 100 microns to provide the desired wear resistance to fuel spray at the exit of spray holes 38. In an embodiment, the desired minimum thickness is about 100-140 microns to provide the desired wear resistance at the exits of spray holes 38.

Figure 3:
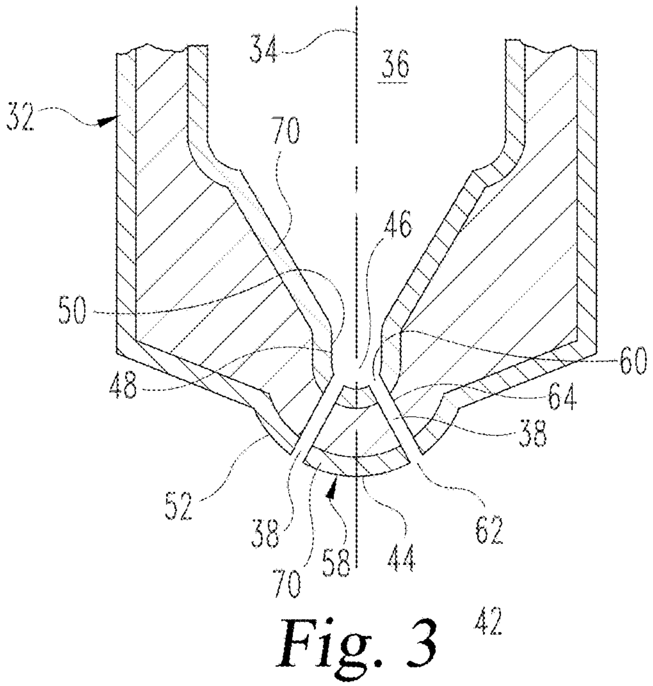
FIG. 3 is a sectional view illustrating certain additional aspects of fabricating a nozzle for the fuel injector of FIG. 1, according to an embodiment of the present disclosure.

In FIG. 3, spray hole 38 is formed through hard wear resistant layer 70 from exterior surface 52 of dome 50 to inner surface 50 of nozzle seat 48. For example, spray hole 38 is formed to include an outlet 62 opening through hard wear resistant layer 70 on exterior surface 52 of nozzle body 32 at dome 58. Spray hole 38 is formed through dome 58 to include an inlet 60 opening through hard wear resistant layer 70 on inner surface 50 of nozzle body 32 at sac 46.

Spray hole 38 includes a hole defining surface 64 through dome 50 that extends around spray hole 38, and hole defining surface 64 extends from outlet 62 to inlet 60. Hole defining surface 64 can be configured to define a tapered spray hole 38 from inlet 60 to outlet 62. Hole defining surface 64 can also or alternatively include, for example, longitudinal and/or spiral grooves, stepped configuration with different diameters, swirl inducing configuration, varying cross-sectional size and/or shape, cylindrical shape, etc. Each of the spray holes 38 may have the same shape and/or configuration, or different shapes and/or configurations.

In an embodiment, inner surface 50 and/or exterior surface 52 include a hard wear resistant layer 70 of material that is created following a two step hardening of nozzle body blank 32' before formation of the spray holes 38. In an embodiment, the first step involves using a first heat treatment to harden a core of nozzle body blank 32' to a first hardness, and the second step involves using a second heat treatment to harden a case, including exterior surface 52 of dome 58 of nozzle body blank 32', to a second hardness greater than the first hardness. Hard wear resistant layer 70 is a material layer that remains on the case or exterior 52 of dome 58 after the hardened nozzle body blank 32' is in a ground, polished, and etched condition after final machining and before forming spray holes 38.

Various techniques for forming the spray holes 38 through the hard wear resistant layer 70 are contemplated, such as electrical discharge machining, electrochemical machining, laser drilling, micro-drilling, etc. In an embodiment, hard wear resistant layer 70 has a thickness extending from outlet 62 along hole defining surface 64 of at least 100 microns after final machining to provide the desired durability for spray hole 38 at or near outlet 62. In an embodiment, hard wear resistant layer 70 has a thickness extending from outlet 62 along hole defining surface 64 of about 100-140 microns after final machining to provide the desired durability at spray hole outlet 62.

Figure 4:
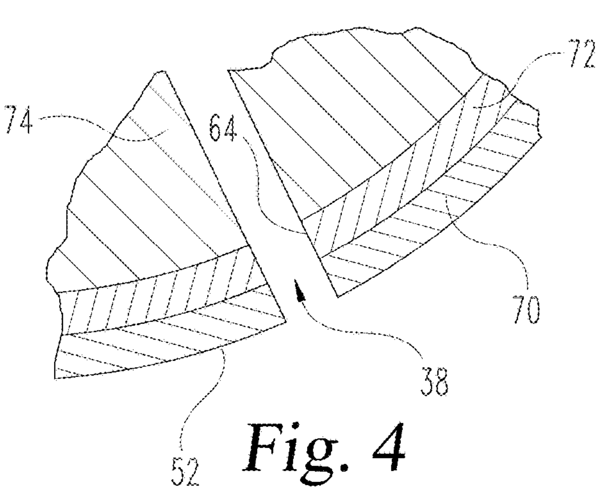
FIG. 4 is a sectional view illustrating layers of material created during fabrication of the nozzle for the fuel injector of FIG. 1, according to an embodiment of the present disclosure.

Referring to FIG. 4, core 74 is the original core material of nozzle body blank 32' after it is core hardened in the first heat treatment of nozzle body blank 32'. The core material for nozzle body blank 32' can be any material suitable for a fuel injector nozzle, including any suitable metal and/or metal alloys, for example. In an embodiment, the hardening of nozzle body blank 32' may create a diffusion layer 72 between hard wear resistant layer 70 and the core 74 of nozzle body blank 32'.

In an embodiment, the hardening of core 74 of nozzle body blank 32' is completed using a diffusive heat process, and the hard wear resistant layer 70 is completed using a diffusive heat process. The diffusive heat process is designed to produce a uniform compound layer, which includes the hard wear resistant layer 70 and may include a porous layer overlying the hard wear resistant layer 70. In an embodiment, the porous layer is removed from over hard wear resistant layer 70 on exterior surface 52, while maintaining a hard wear resistant layer 70 of desired minimum thickness, before formation of spray holes 38 through dome 58. In an embodiment, the diffusive heat process is a gas nitriding process.

In an embodiment, hole defining surface 64 includes a hardened surface profile that varies along a length of spray hole 38. For example, hole defining surface 64 includes a first hardness that extends from exterior surface 52 toward inner surface 50 for a distance corresponding to a thickness of hard wear resistant layer 70, and a second hardness that is less than the first hardness that extends along core 74 to the hard wear resistant layer on inner surface 50. The hard wear resistant layer on inner surface 50 may include a hardness that is greater than the hardness of core 74.

In an embodiment, porosity from the porous layer overlying the hard wear resistant layer 70 that is formed by the case hardening nitriding process is removed by a machining process before formation of spray holes 38. The machining process is controlled so as to preserve a desired minimum thickness for the hard wear resistant layer 70 while removing the porous layer. In an embodiment, the hardening and machining processes are controlled so that the thickness of the hard wear resistant layer 70 is about 100-140 microns after removal of the porous layer. In an embodiment, the nitriding process is designed to provide a thickness of the hard wear resistant layer 70 that is at least 100 microns upon completion of the abrasive flow machining process. In an embodiment, the hard wear resistant layer 70 lacks surface porosity after the machining.

The outlet 62 of spray hole 38, and outlets of the other spray holes formed through hard wear resistant layer 70, is provided with enhanced mechanical and chemical properties due to forming spray hole 38 through a hard wear resistant layer 70 created before forming the spray hole 38. For example, outlet 62 of spray hole 38 has improved wear and corrosion performance characteristics over nozzles with spray holes formed through an exterior surface lacking the hard wear resistant surface 70. The nitride process in the present disclosure forms a very hard outer "shell" layer on nozzle body blank 32' that has compressive residual stress, making the outlet 62 of spray hole 38 very robust against wear and fatigue.

A method 500 is illustrated in FIG. 5 for fabricating a fuel injector nozzle according to the present disclosure. Method 500 includes an operation 502 to core harden a nozzle body blank 32'. The nozzle body blank 32' may be machined from a solid soft blank of core material that will eventually form the nozzle 30. The nozzle body blank 32' may be machined to form the external shape and internal shape of nozzle 30, such as fuel passage 36, before core hardening. However, spray holes 38 are not yet formed before hardening the nozzle body blank 32'.

The core hardening treatment of the nozzle body blank 32' can be, for example, a diffusive heat process, such as a gas nitriding process, to enhance core hardness to a particular hardness to aid in subsequent machining. This first hardening treatment is then followed by a second hardening treatment to form hard wear resistant layer 70 on the exposed surfaces, including exterior surface 52 of dome 58, of the core-hardened nozzle body blank 32'. The second hardening treatment may also be, for example, a diffusive heat process, such as a gas nitriding process. Other embodiments contemplate any suitable heat treatment process for hardening core 74 and/or the exterior of dome 58.

The case hardening of nozzle body blank 32' forms hard wear resistant layer 70 along inner surface 50 and/or exterior surface 52, including on dome 58. The exterior surface 52 of nozzle body blank 32' at dome 58 is case hardened to a second hardness that is greater than the hardness of hardened core 74. In an embodiment, core 74 is hardened to 40-45 HRC (Rockwell hardness), and hard wear resistant layer 70 is hardened to a hardness of 60-65 HRC.

Method 500 continues at operation 504 to maintain hard wear resistant layer 70 on exterior surface 52 of dome 58 while machining nozzle body blank 32'. In an embodiment, the exterior of nozzle body blank 32' is machined after case hardening to a final dimension for nozzle 30 while maintaining hard wear resistant layer 70 at a desire minimum thickness on exterior surface 52 of dome 50.

Method 500 continues at operation 506 to form spray holes 38 through hard wear resistant layer 70 on dome 58 in the case hardened nozzle body blank 32'. The spray hole locations may be laser marked, and spray holes 38 can be formed from exterior surface 52 of dome 50, through the exterior hard wear resistant layer 70, core 74, and then through the interior hard wear resistant layer.

Spray holes 38 may be formed in the core hardened and case hardened nozzle body blank 32' using any suitable hole forming device and/or technique, as discussed above. The outlets 62 of spray holes 38 extend through hard wear resistant layer 70 on exterior surface 52 of dome 58. After spray holes 38 are formed, no further machining or removal of material on exterior surface 52 of dome 58 is required or performed. The hard wear resistant layer 70 extends along the outlet ends of spray holes 38 and outwardly from the outlets 62 of spray holes 38 along the exterior surface 52 of dome 58.

Further written description of a number of aspects of the present disclosure shall now be provided. According to one aspect, nozzle for a fuel injector is provided. The nozzle includes an elongated body extending along a longitudinal axis. The body extends along the longitudinal axis from a first end of the elongated body to an opposite second end of the elongated body. The elongated body includes an inner surface defining a longitudinally extending fuel passage, and an exterior surface at the second end of the elongated body. The fuel passage extends from the first end of the elongated body to the second end of the elongated body, and at least one spray hole is formed at the second end of the elongated body. The exterior surface includes a hard wear resistant layer formed thereon. The at least one spray hole is formed through the hard wear resistant layer formed on the exterior surface of the elongated body to extend from the exterior surface to the inner surface.

In an embodiment, the inner surface includes a hard wear resistant layer at the second end of the elongated body, and the at least one spray hole is formed through the hard wear resistant layers formed on the exterior surface and the interior surface.

In an embodiment, the at least one spray hole includes a plurality of spray holes, and each of the plurality of spray holes is formed through the hard wear resistant layer on the exterior surface of the elongated body.

In an embodiment, the second end of the elongated body includes a dome and the hard wear resistant layer is formed on a convex exterior surface of the dome.

In an embodiment, a core of the elongated body is hardened to a first hardness, and the exterior of elongated body is hardened to a second hardness greater than the first hardness in order to form the hard wear resistant layer before forming the at least one spray hole.

In an embodiment, the at least one spray hole includes a hole defining surface that extends from an outlet at the exterior surface of the elongated body to an inlet on the interior surface of the elongated body. The hard wear resistant layer extends along the hole defining surface from the outlet toward the inlet so that the hole defining surface includes a first hardness along the hard wear resistant layer and a second hardness along a core of the nozzle body that is less than the first hardness.

In a further embodiment the hard wear resistant layer extends outwardly from the outlet of the at least one spray hole along the exterior surface of the elongated body. The hard wear resistant layer extends outwardly from the inlet of the at least one spray hole along an inner surface of the elongated body.

In an embodiment, the hard wear resistant layer includes a thickness that is at least 100 microns.

In an embodiment, the hard wear resistant layer includes a thickness that is about 100-140 microns.

According to another aspect of the present disclosure, a method for producing a fuel injection nozzle is provided. The method includes hardening a nozzle body blank to include a hardened core and a hardened case that is harder than the hardened core; machining the hardened case of the nozzle body blank to maintain a hard wear resistant layer on an exterior surface of the nozzle body blank; and forming at least one spray hole through the hard wear resistant layer on the exterior surface of the nozzle body blank.

In an embodiment, machining the hardened case is controlled so that a minimum thickness is maintained for the hard wear resistant layer on the exterior surface after the machining is complete.

In an embodiment, machining the hardened case is controlled so that a minimum thickness for the hard wear resistant layer on the exterior surface is at least 100 microns after the machining is complete. In an r embodiment, machining the hardened case is controlled so that a minimum thickness for the hard wear resistant layer on the exterior surface is about 100-140 microns after the machining is complete.

In an embodiment, an inner surface of the hardened case includes a hard wear resistant layer. The inner surface defines a fuel passage. The method further includes forming the at least one spray hole from the exterior surface through the inner surface.

In an embodiment, the method includes forming a dome on the nozzle body blank that includes at least part of the exterior surface, and forming the at least one spray hole through the dome.

In an embodiment, hardening the nozzle body blank includes hardening the core of the nozzle body blank to a first hardness, and hardening the case of the nozzle body blank to a second hardness that is greater than the first hardness.

In a further embodiment hardening the core to the first hardness includes hardening the core to about 40-45 HRC and hardening the case to the second hardness includes hardening the case to about 60-65 HRC. In a further embodiment, the core is hardened in a core hardening heat treatment process and the case is hardened in a case hardening heat treatment process conducted after the core hardening heat treatment process and before forming the at least one spray hole.

In an embodiment, hardening the nozzle body blank includes subjecting the nozzle body blank to two separate diffusive heat processes to first harden the core of the nozzle body blank and then to case harden the exterior surface of the nozzle body blank. In a further embodiment the diffusive heat process is a gas nitriding process.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A nozzle for a fuel injector, the nozzle comprising:

an elongated body extending along a longitudinal axis, the body extending along the longitudinal axis from a first end of the elongated body to an opposite second end of the elongated body, the elongated body including:

an inner surface defining a longitudinally extending fuel passage, the fuel passage extending from the first end of the elongated body to the second end of the elongated body;

an exterior surface at the second end of the elongated body, the exterior surface including a machined hard wear resistant layer formed thereon by machining a hardened nozzle body blank before any spray holes are formed through the hardened nozzle body blank; and at least one spray hole at the second end of the elongated body, the at least one spray hole being formed through the machined hard wear resistant layer formed on the exterior surface of the elongated body to extend from the exterior surface to the inner surface, wherein along the spray hole the elongated body has a first hardness at the exterior surface and a second hardness between the exterior surface and the inner surface, and the first hardness is greater than the second hardness.

2. The nozzle of claim 1, wherein the inner surface includes a hard wear resistant layer at the second end of the elongated body, and the at least one spray hole is formed through the hard wear resistant layers formed on the exterior surface and the interior surface.

3. The nozzle of claim 1, wherein the at least one spray hole includes a plurality of spray holes, and each of the plurality of spray holes is formed through the hard wear resistant layer on the exterior surface of the elongated body.

4. The nozzle of claim 1, wherein the second end of the elongated body includes a dome and the hard wear resistant layer is formed on a convex exterior surface of the dome.

5. The nozzle of claim 1, wherein a core of the elongated body is hardened to a first hardness, and the exterior of elongated body is hardened to a second hardness greater than the first hardness in order to form the hard wear resistant layer before forming the at least one spray hole.

6. The nozzle of claim 1, wherein the at least one spray hole includes a hole defining surface that extends from an outlet at the exterior surface of the elongated body to an inlet on the interior surface of the elongated body, and the hard wear resistant layer extends along the hole defining surface from the outlet toward the inlet so that the hole defining surface includes the first hardness along the hard wear resistant layer and the second hardness along a core of the nozzle body.

7. The nozzle of claim 6, wherein:

the hard wear resistant layer extends outwardly from the outlet of the at least one spray hole along the exterior surface of the elongated body; and the hard wear resistant layer extends outwardly from the inlet of the at least one spray hole along an inner surface of the elongated body.

8. The nozzle of claim 1, wherein the hard wear resistant layer is formed before any spray holes are formed by removing via machining a porous layer from over the hard wear resistant layer and the machining is controlled so that a thickness that is at least 100 microns is maintained for the machined hard wear resistant layer.

9. The nozzle of claim 1, wherein the hard wear resistant layer includes a thickness that is about 100-140 microns.

10. A method for producing a fuel injection nozzle, the method comprising:

hardening a nozzle body blank to include a hardened core and a hardened case that is harder than the hardened core, the nozzle body blank being hardened before forming of any spray holes through the nozzle body blank;

machining the hardened case of the nozzle body blank to maintain a hard wear resistant layer on an exterior surface of the nozzle body blank; and forming at least one spray hole through the hard wear resistant layer on the exterior surface of the nozzle body blank after machining the hardened case.

11. The method of claim 10, wherein machining the hardened case includes removing a porous layer from over the hard wear resistant layer and the machining is controlled so that a minimum thickness is maintained for the hard wear resistant layer on the exterior surface after the machining is complete and before forming of any spray holes through the nozzle body blank.

12. The method of claim 10, wherein machining the hardened case is controlled so that a minimum thickness of at least 100 microns is maintained for the hard wear resistant layer on the exterior surface after the machining is complete.

13. The method of claim 10, wherein machining the hardened case is controlled so that a minimum thickness of about 100-140 microns is maintained for the hard wear resistant layer on the exterior surface after the machining is complete.

14. The method of claim 10, wherein an inner surface of the hardened case includes a hard wear resistant layer, the inner surface defining a fuel passage, and further comprising:

forming the at least one spray hole from the exterior surface through the inner surface.

15. The method of claim 10, further comprising forming a dome on the nozzle body blank that includes at least part of the exterior surface, and forming the at least one spray hole includes forming the at least one spray hole through the dome.

16. The method of claim 10, wherein hardening the nozzle body blank includes:

hardening the core of the nozzle body blank to a first hardness; and hardening the case of the nozzle body blank to a second hardness that is greater than the first hardness.

17. The method of claim 16, wherein hardening the core to the first hardness includes hardening the core to about 40-45 HRC and hardening the case to the second hardness includes hardening the case to about 60-65 HRC.

18. The method of claim 16, wherein the core is hardened in a core hardening heat treatment process and the case is hardened in a case hardening heat treatment process conducted after the core hardening heat treatment process and before forming the at least one spray hole.

19. The method of claim 10, wherein hardening the nozzle body blank includes subjecting the nozzle body blank to two separate diffusive heat processes to first harden the core of the nozzle body blank and then to case harden the exterior surface of the nozzle body blank.

20. The method of claim 19, wherein the diffusive heat process is a gas nitriding process.

* * * * *